(12) United States Patent
Ishiwata et al.

(10) Patent No.: US 6,392,851 B1
(45) Date of Patent: May 21, 2002

(54) MAGNETORESISTANCE EFFECT TYPE COMPLEX HEAD AND METHOD FOR MANUFACTURING THE SAME

(75) Inventors: Nobuyuki Ishiwata; Tsutomu Ishi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/400,543

(22) Filed: Sep. 21, 1999

(30) Foreign Application Priority Data

Sep. 22, 1998 (JP) .......................................... 10-268142

(51) Int. Cl.⁷ ............................. G11B 5/187; G11B 5/39
(52) U.S. Cl. ....................................... 360/317; 360/122
(58) Field of Search ................................ 360/317, 319, 360/126, 122

(56) References Cited

U.S. PATENT DOCUMENTS

| 5,438,747 A | | 8/1995 | Krounbi et al. |
| 5,850,326 A | * | 12/1998 | Takano et al. ............. 360/122 |
| 5,898,542 A | * | 4/1999 | Koshikawa et al. ........ 360/103 |
| 5,986,978 A | * | 11/1999 | Rottmayer et al. ............ 369/13 |
| 6,111,723 A | * | 8/2000 | Takano et al. ............. 360/122 |

FOREIGN PATENT DOCUMENTS

| JP | 07-262519 | 10/1995 |
| JP | 09-274706 | 10/1997 |
| JP | 10-162315 | 6/1998 |

OTHER PUBLICATIONS

Hunt, R.P., *IEEE Transactions on Magnetics* (vol. MAG–7, No. 1), "A Magnetoresistive Readout Transducer", pp. 150–154, (Mar. 1971).
Yoshida M., et al., *IEEE Transactions on Magnetics* (vol. 29, No. 6), "Edge Eliminated Head", pp. 3837–3839, (Nov. 1993).

* cited by examiner

*Primary Examiner*—William Klimowicz
(74) *Attorney, Agent, or Firm*—Foley & Lardner

(57) ABSTRACT

Disclosed is a magnetoresistance effect type complex head including: (1) a magnetoresistance effect head including: a magnetoresistance effect element 15 which includes a central region 12 for detecting a magnetic field from a record medium and a pair of terminal portions 13, 14 for supplying a bias magnetic field and a current to the central region; a pair of magnetic separators 11, 16 confronting each other, sandwiching the magnetoresistance effect element, and each including an insulator; and a first and second magnetic shield films 10, 17 confronting each other, and sandwiching the magnetoresistance effect element and the pair of magnetic separators; (2) an inductive head including: a first magnetic pole film 17 which is also used as the second magnetic shield; a magnetic gap 18 piled up on the first magnetic pole; a second magnetic pole film 19 piled up on the magnetic gap; and a coil pattern for generating a magnetic flux which flows through the first and second magnetic pole films; (3) a pair of pits 20 recessed in a direction perpendicular to an air bearing surface and disposed on both lateral sides of the second magnetic pole film to determine a width of the second magnetic pole film; and (4) a pattern 8 for determining a position of the pair of recesses.

5 Claims, 8 Drawing Sheets

WAFER PROCESS

CUT OUT BAR

AIR BEARING SURFACE

POLISH AIR BEARING SURFACE

POLE TRIMMING WITH FOCUSED ION BEAM

61: ELECTRODE TERMINALS
33: COIL PATTERN
62: ELEMENT PORTION

MAGNETORESISTANCE EFFECT TYPE COMPLEX HEAD AND METHOD FOR MANUFACTURING THE SAME

BACKGROUND OF THE INVENTION

1. Field of the Invention

The present invention relates to a complex head consisting of a reading head making use of a magnetoresistance effect and an inductive recording head. The complex head is used for, for example, a magnetic recording and reproducing apparatus.

2. Description of the Prior Art

Heretofore, there is a tendency that a size of a record bit on a magnetic record medium rapidly becomes small in size as magnetic record mediums become small in size and vast in capacity. In order to deal with such tendency, a magnetoresistance effect type head (hereinafter, referred to as "MR head") which has a high-level output has been put to practical use. An MR head is discussed in "A Magnetoresistivity Readout Transducer" (IEEE Transaction on Magnetics, MAG 7 (1971), p.150).

FIGS. 1A, 1B, and 2 show magnetoresistance effect type complex head (hereinafter, referred to as "MR complex head") consisting of an MR head for reading and an inductive head (hereinafter, referred to as "ID head") for recording as a first prior art. FIG. 1A is a plan view, FIG. 1B is a cross-sectional view taken along line A–A' in FIG. 1A, and FIG. 2 is a front elevation. FIG. 2 is taken from the left of FIG. 1A or 1B. A plane shown in FIG. 2 confronts a record medium and referred to as an air-bearing plane.

Referring to FIGS. 1A and 1B, members indicated by reference numerals 31 and 32 are insulators, a number indicated by reference numeral 33 is a coil pattern. Coil pattern 33 is visible in FIG. 1A because insulator 31 is semi-transparent.

Referring to FIG. 2, the MR head comprises two face-to-face magnetic shield films S1 indicated by 10 and S2 indicated by 17, magnetic separators 11 and 16 comprising insulators, and magnetoresistance effect element (hereinafter, referred to as "MR element") 15 disposed between magnetic shield film S1 (10) and magnetic shield film S2 (17) with interposition of magnetic separators 11 and 16. The ID head comprises a magnetic pole film P1 indicated by 17, magnetic pole film P2 indicated by 19, and magnetic gap 18. Therefore, the portion indicated by 17 is magnetic shield film S2 as well as magnetic pole film P1.

The MR complex head causes a considerably strong side fringe magnetic field while recording. This side fringe magnetic field is caused by a leakage of a magnetic flux to a portion of magnetic pole film P1 (17) over a width of magnetic pole film P2 (19) because magnetic pole film P1 (17) is wider than magnetic pole film P2 (19). This side fringe magnetic field restricts an allowable minimum track width and therefore a track density. Therefore, it is necessary to reduce this side fringe magnetic field in order to attain a high-density magnetic recording with an MR complex head.

A conventional ID head for recording/reading caused a weak side fringe magnetic field because the conventional ID head was so designed that a lateral side of magnetic pole film P1 and a lateral side of magnetic pole film P2 are substantially disposed on a same plane at and near to an air bearing surface at both lateral sides. The lateral sides determines a track width. On the other hand, as to an MR complex head, magnetic pole film P1 (17) is considerably wider than magnetic pole film P2 (19) of which width determines a track width because magnetic pole film P1 (17) needs to have a function to shield an MR element 15. This difference in width causes a side fringe magnetic field which extends over a width of magnetic pole film P2 (19) laterally.

A second prior art is an MR complex head disclosed in JPA 7-262519 and shown in FIG. 3, and it causes as weak a side fringe magnetic field as an ID head. Referring to FIG. 3, the second prior art MR complex head comprises magnetic pole film P3 which is indicated by 17'. Magnetic pole film P3 (17') is disposed between magnetic pole film P1 (17) and magnetic gap G (18) and parallel to a surface of magnetic pole film P1 (17), and magnetically continues with magnetic pole film P1 (17). Each of two lateral sides of magnetic pole film P3 (17') is disposed on the same plane with each of two lateral sides of magnetic pole film P2 (19) which determines a width of magnetic pole film P2 (19). Also, each of two lateral sides of magnetic pole film P3 (17') is perpendicular to a surface of magnetic pole film P1 (17). On such structure, a magnetic field for recording is caused between magnetic pole film P2 (19) and magnetic pole film P3 (17'), and therefore a side fringe magnetic field is suppressed as a conventional ID head.

The method for manufacturing magnetic pole film P3 (17') is shown in FIG. 4. Referring to FIG. 4, magnetic gap G (18) is formed on magnetic pole film P1 (17) which is also used as a magnetic shield S2 of an MR head. Then, a coil insulated by a photoresist is formed. Then, magnetic pole film P2 (19) having a prescribed width is formed by frame plating process with restriction by photo resist frame 23. Then, magnetic pole film P3 (17') is formed to a desired edged depth by an ion beam milling using magnetic pole film P2 (19) as a mask. When forming magnetic pole film P3 (17'), it is possible to make lateral sides of magnetic pole film P2 (19) and P3 (17') perpendicular to an upper surface of magnetic pole film P1 (17). By setting a depth of magnetic pole film P3 (17') to the desired value, a recording magnetic flux is substantially restricted by magnetic pole films P2 (19) and P3 (17'), and therefore a side fringe magnetic field is suppressed as a conventional ID head.

As explained above, in the method for manufacturing the MR complex head according to the second prior art, the ion beam milling is heavily used for forming magnetic pole film P3 (17'). A thickness of magnetic pole film P2 (19) decreases as the milling continues because magnetic pole film P2 (19) serves as a mask during the milling. Therefore, an initial thickness of magnetic pole film P2 (19) must be set in consideration of the decrease due to the milling in order to obtain a desired final thickness of magnetic pole film P2 (19). In addition, in the method for manufacturing the MR complex head according to the second prior art, a height of frame 23 must be set considerably high as compared to a conventional method for forming initial magnetic pole film P2 (19) by the frame plating process. That is, magnetic pole film P2 (19) before the milling must be considerably thick in order to obtain a thickness of magnetic pole film P2 (19) after the milling which ensures recording characteristics because the thickness of magnetic pole film P2 (19) after the milling is considerably decreased as compared with the thickness thereof before the milling. However, if a height of frame 23 is set high in order to form a magnetic pole film P2 (19) of a sufficient thickness, it is difficult to narrow a distance between two parts of frame 23. The lower limit of the distance between the two parts of frame 23 is 2 $\mu$m in the second prior art. That is, it was difficult to manufacture an MR complex head which realizes a high recording density of a track width of under 2 $\mu$m according to the method for manufacturing the MR complex head according to the second prior art.

As explained above, when the structure for reducing a side fringe of a recording magnetic field generated by an ID head is selected for an MR complex head comprising an MR head and an ID head, it paradoxically becomes difficult to manufacture the structure for a narrow track.

One of methods for solving such dilemma is setting a width of magnetic pole film P2 and forming magnetic pole film P3 in combination by a ion beam edging from an air bearing surface during a bar process after having finished a wafer process instead of setting the width of magnetic pole film P2 and forming, on magnetic pole film P1, magnetic pole film P3 having lateral surfaces common with magnetic pole film P2 by a wafer process. This method is a third prior art. FIGS. 5 and 6 show an MR complex head of the third prior art which causes a reduced side fringe of a recording magnetic field from an ID head. Referring to FIGS. 5 and 6, a width of magnetic pole film P2 (19) is determined by pits 20 which are formed by a ion beam edging from an air bearing side executed in a bar process following a wafer process. A projection 17a toward magnetic pole film P2 having lateral sides common with magnetic pole film P2 is also formed in magnetic pole film P1 (17) by the ion beam edging from the air bearing side. Accordingly, a structure for reducing a side fringe magnetic field is easily realized.

FIG. 6 is a perspective view of the MR complex head of the third prior art, and FIG. 7 is a front elevation of a slider with the MR complex head of the third prior art in which numeral 22 stands for a slider and 21 stands for an alumina portion.

A method for manufacturing a thin-film head which comprises an ID head for recording/reading is disclosed in "Edge Eliminated Head" (IEEE Trans. on Magn., Vol. 29, No. 6 (1993), 3837) which is a fourth prior art. In the method of the fourth prior art, an ion beam edging from an air bearing surface for configuring a structure which suppresses an undershoot in a reproduced waveform is executed. However, if the method of the fourth prior art is applied to a head for a high-density recording/reading such as an MR complex head comprising an MR head and an ID head, dust accumulates in a pit formed by an ion beam edging, and to the worst the head crashes because a distance between the head and a record medium is extremely short.

An MR complex head which comprises a non-magnetic material inserted into a pit formed by an ion beam edging is disclosed in JPA 10-162315 which is a fifth prior art. An edging using a focused ion beam (FIB) for high-accuracy is also disclosed in JPA 10-162315.

The method for determining a width of magnetic pole P2 (19) and forming magnetic pole P3 (17a) in combination by an ion beam edging from an air bearing surface executed in a bar process after a wafer process is simple and safe. However, the method has a disadvantage of variation of a relational position between an recording ID head of a width determined as mentioned and a reading MR head, which becomes conspicuous as a width of magnetic pole films become narrower than 1 $\mu$m. That is, when considering an application of an MR complex head to a magnetic disk drive, if a relational position between an ID head and an MR head does not fall within a certain range, an angle of the ID head deviates from an angle of the MR head when they are positioned at a certain track by a rotary actuator, and accordingly an effective recording/reading can not be executed.

JPA 10-162315 discloses a method for determining a width of magnetic pole film P2 by a focused ion beam, but does not disclose a method for correcting an offset between an MR head and an ID head in connection with positioning pits determining the width of magnetic pole film P2. In practice, it is general that positions of pits are determined with respect to magnetic pole film P2 (19) and then the pits determining a width of magnetic pole films are formed. Therefore, variation caused when positioning the pits determining a width of magnetic pole films as well as variation caused when positioning an ID head on a wafer constitute variation of a position of the ID head with respect to an MR head. Thus, when a width of magnetic pole films becomes narrower than 1 $\mu$m so as to be used for a high-density recording, a variation of a relative position between an MR head and an ID head becomes a difficulty, resulting in a decrease in yield rate.

SUMMARY OF THE INVENTION

In order to overcome the aforementioned disadvantages, the present invention has been made and accordingly, has an object to provide a magnetroresistance effect type complex head consisting of an MR head and an ID head which has a variation of a relative position between the MR head and the ID head being reduced to be negligible as compared with a with of magnetic pole films less than 1 $\mu$m to meet a specification of an ultra high-density magnetic recording/reproducing apparatus notwithstanding the head is produced by a process which includes a step of determining a width of magnetic pole films from an air bearing surface. Another object of the present invention is to provide a method for manufacturing such magnetroresistance effect type complex head with a high yield rate.

According to a first aspect of the present invention, there is provided a magnetroresistance effect type complex head comprising: (1) a magnetroresistance effect head comprising: a magnetroresistance effect element comprising a central region for detecting a magnetic field from a record medium and a pair of terminal portions for supplying a bias magnetic field and a current to the central region; a pair of magnetic separators confronting each other, sandwiching the magnetoresistance effect element, and each comprising an insulator; and a first and second magnetic shield films confronting each other, and sandwiching the magnetroresistance effect element and the pair of magnetic separators; (2) an inductive head using the second magnetic shield as a first magnetic pole film; and comprising a magnetic gap piled up on the first magnetic pole film; a second magnetic pole film piled up on the magnetic gap; and a coil pattern for generating a magnetic flux which flows through the first and second magnetic pole films; (3) a pair of pits digged in a direction perpendicular to an air bearing surface and disposed on both lateral sides of the second magnetic pole film to determine a width of the second magnetic pole film; and (4) a pattern for determining a position of the pair of recesses.

The pattern may be formed of recesses formed in the first magnetic shield.

Each of the recesses may be disposed under each of the pair of terminal portions.

Each of the recesses may be disposed under a outwardly and laterally extended position from each of the pair of terminal portions.

A width of the second magnetic pole film may be less than 1 $\mu$m.

The first magnetic pole film may have a pair of recesses where the pair of pits invade so that a third magnetic pole film projecting toward the second magnetic pole film and having a width as same as the second magnetic pole film is formed.

According to a second aspect of the present invention, there is provided a method for manufacturing a magnetoresistance effect type complex head comprising steps of: providing a wafer; forming a first magnetic shield on the wafer; forming an alignment mark and a pattern on the first magnetic shield using a single photomask; forming a magnetoresistance effect element on the first magnetic shield using the alignment mark as a reference of a position; forming a second magnetic shield which also functions as a first magnetic pole film on the magnetoresistance effect element; forming a gap on the second magnetic shield; forming a second magnetic pole film on the gap; cutting out a bar from the wafer; polishing the bar from an air bearing surface; and forming a pair of pits from the air bearing surface to determine a width of the second magnetic pole film using the pattern as a reference of a position.

The method may further comprise steps of: cutting out a chip from the bar; and assembling the chip to a suspension.

At the step of forming the pair of pits, the pair of pits may be formed so that the pair of pits generates a third magnetic pole film which has lateral sides common with the second magnetic pole film in said second magnetic shield.

At the step of forming the pair of pits, the pair of pits may be formed by a ion beam edging method.

The ion beam edging method may be executed using a focused ion beam.

These and other objects, features and advantages of the present invention will become more apparent in light of the following detailed description of the best mode embodiments thereof, as illustrated in the accompanying drawings.

DETAILED DESCRIPTION OF THE PREFERRED EMBODIMENTS

Preferred embodiments according to the present invention will be described with reference to the accompanying drawings.

[First Embodiment]

Figure 8:
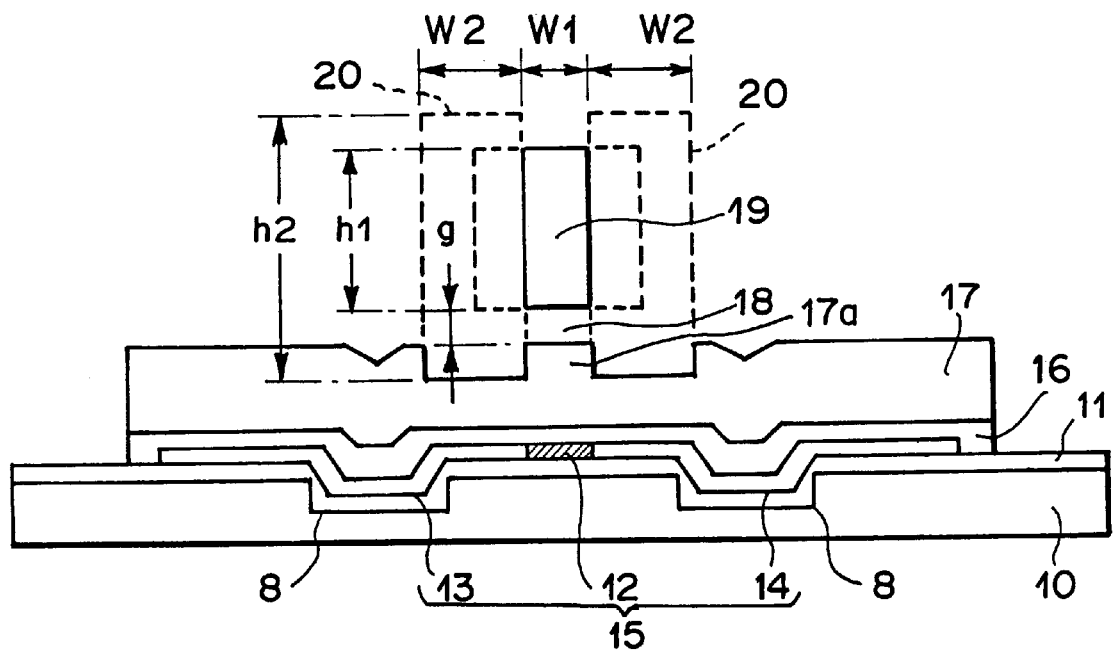
FIG. 8 is a front elevation of an MR complex head according to a first embodiment of the present invention.

Referring to FIG. 8, reference numerals 10 and 17 indicate magnetic shields for MR element, and reference 10 indicates lower magnetic shield S1 and reference 17 indicates upper magnetic shield S2. Recesses 8 are formed in lower shield S1 (10). Recesses 8 are exposed to an air bearing surface when the head is completed. Recesses 8 are formed in a process of forming alignment marks used for aligning various masks. The process of forming alignment masks is included in a process of forming an MR complex head on a wafer. Each of lower shield S1 (10) and upper shield S2 (17) is formed of a NiFe alloy or a Permalloy. A thickness of lower shield S1 (10) is 2 $\mu$m and a thickness of upper shield S2 (17) is 3 $\mu$m. Between lower shield S1 (10) and upper shield S2 (17) is MR element 15 which is formed of central region 12 which senses a magnetic field from a record medium, terminal regions 13 and 14 at both sides of central region 12 for supplying a current and a perpendicular bias magnetic field to central region 12.

Central region 12 of MR element 15 is generally composed of a laminate having a giant MR effect called spin bulb. That is, central region 12 is composed of Ta film of 5 nm in thickness, PtMn film of 25 nm in thickness, CoFe film of 4 nm in thickness, Cu film of 2.7 nm in thickness, CoFe film of 1 nm in thickness, NiFe film of 8 nm in thickness, and Ta film of 3 nm in thickness. A width of central region 12 is 0.4 $\mu$m. Terminal portions 13 and 14 are electrically connected with central portion 12 and each of terminal portions 13 and 14 are composed of a laminate consisting of CoPtCr film of 25 nm in thickness for supplying the perpendicular bias to central region 12 and Au film for supplying the current to central region 12. MR element 15 is sandwiched between lower shield 10 and upper shield 17 with interposition of magnetic separators 11 and 16 each of which is composed of an alumina film. MR element 15 is isolated from lower shield 10 and upper shield 17. A thickness of lower magnetic separator 11 is 60 nm and a thickness of upper magnetic separator 16 is 80 nm.

Recesses 8 are formed in lower shield 10 as shown in FIG. 8.

Upper shield 17 also serves as a magnetic pole film P1 of an ID head. On upper shield 17 (magnetic pole film P1) is another magnetic pole film P2 (19) and a magnetic gap 18 therebetween which is composed of an alumina. Magnetic film P2 (19) is composed of NiFe. Pits 20 determining a width of magnetic film P2 (19) to be 0.6 $\mu$m is formed along lateral sides of magnetic film P2 (19). Positioning of pits 20 when forming pits 20 is executed with respect to recesses 8 formed in lower shield 10. Pits 20 are 0.8 $\mu$m in depth, 2 $\mu$m in width which is represented by W2, 4 $\mu$m in height, which is represented by h2, along a direction of a thickness of magnetic pole film P2 (19). The thickness of magnetic pole film P2 (19) which is represented by h1 is 3.5 $\mu$m. A length of magnetic gap 18 which is represented by g is 0.2 $\mu$m.

Figure 1A:
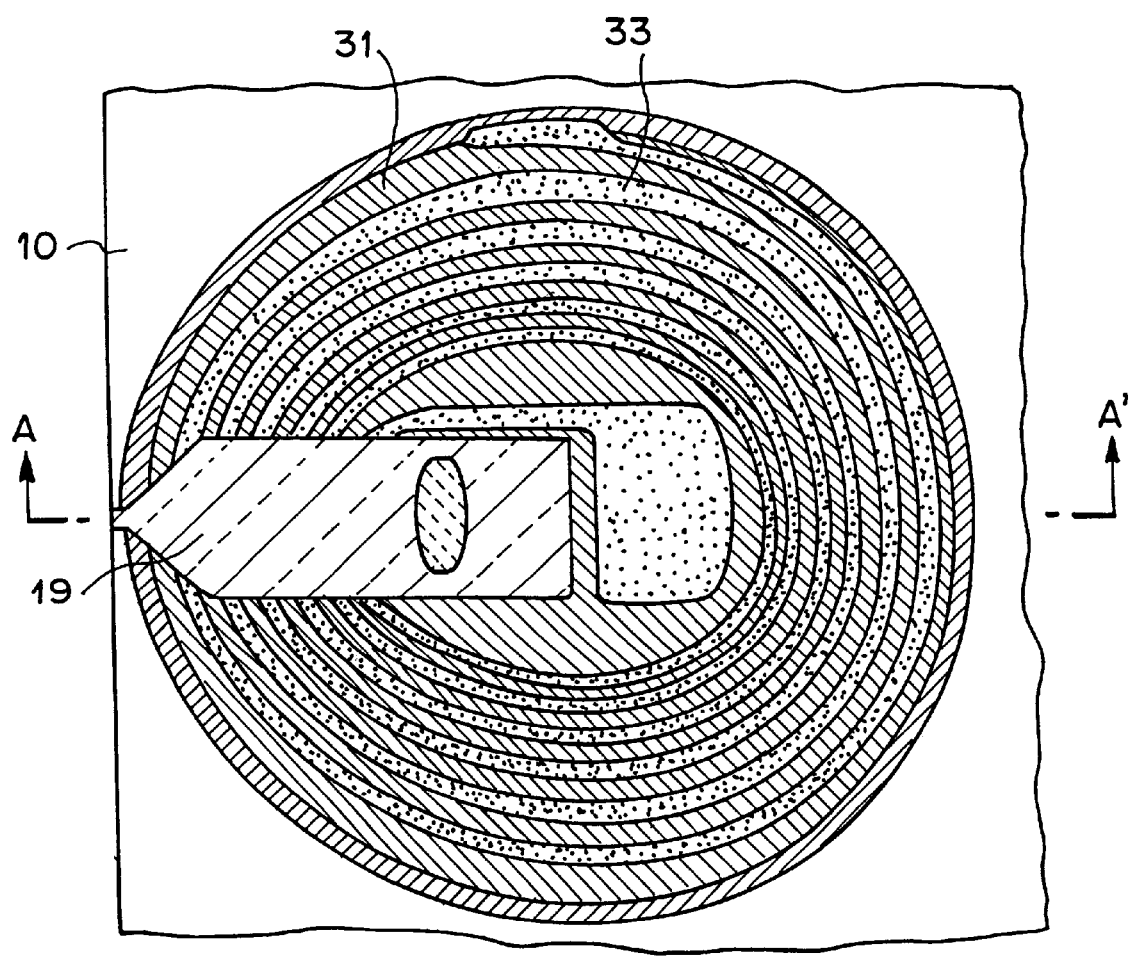
FIG. 1A is a plan view of an MR complex head.
Figure 1B:
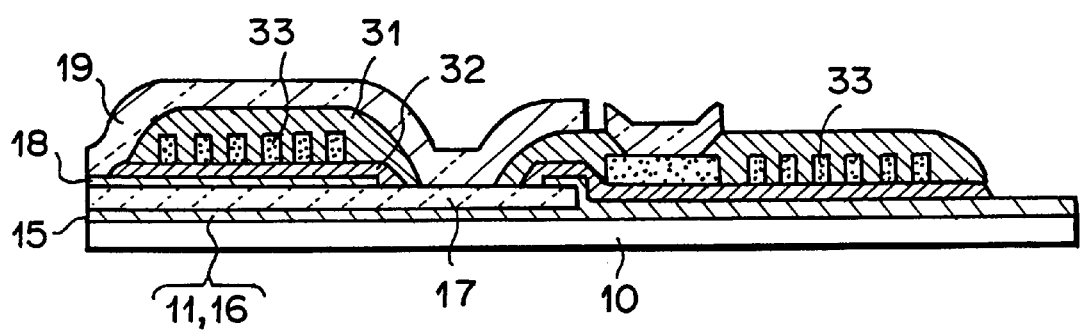
FIG. 1B is a cross-sectional view of the MR complex head taken along line A–A' of FIG. 1A.
Figure 2:
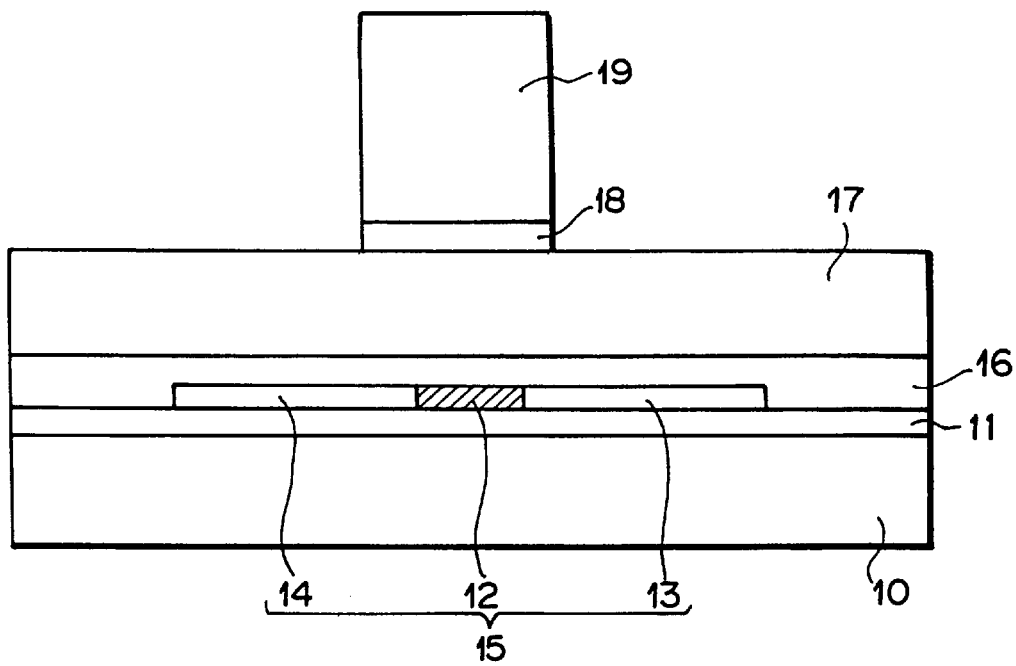
FIG. 2 is a front elevation of the MR complex head of the first prior art taken from an air bearing surface.
Figure 3:
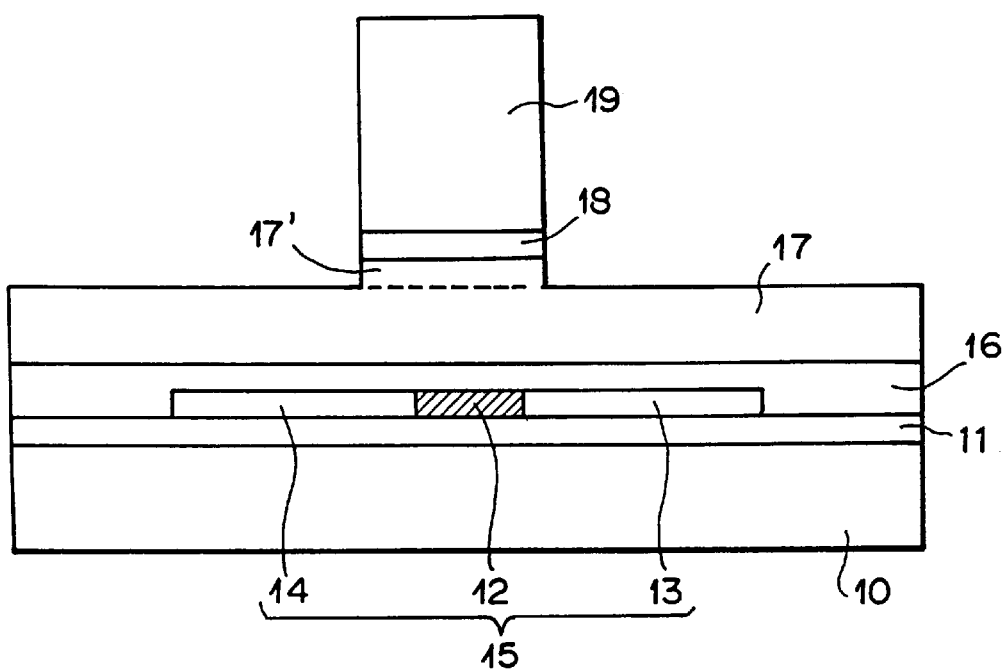
FIG. 3 is a front elevation of the MR complex head of the second prior art.
Figure 4:
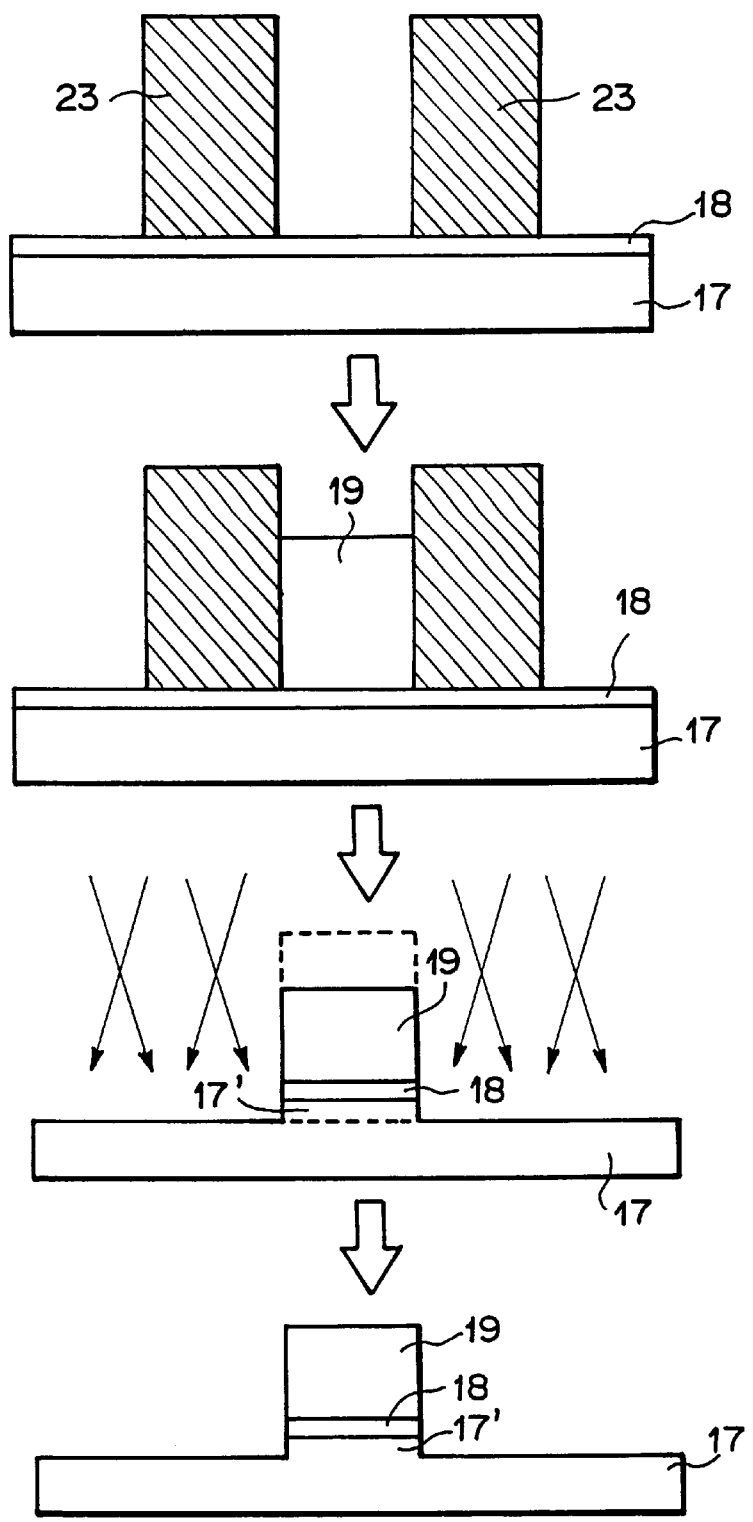
FIG. 4 is a diagram for explanation of a process for manufacturing the MR complex head of the second prior art.

The MR complex head of this embodiment has a plan view and a cross-sectional view similar to those as shown in FIGS. 1A and 1B, respectively. Therefore, a current which flows coil pattern 33 generates a magnetic flux which flows magnetic pole film P1 (17) and magnetic pole film P3 (17a), and magnetic pole film P2 (19). The current is supplied from a recording circuit of a magnetic recording and reproducing apparatus.

That is, at the internal area apart from the air bearing surface by about 2 $\mu$m is a Cu coil pattern 33 which is isolated by a photo-resist materials 31 and 32. A recording magnetic field is generated between magnetic pole film P1 (17) and magnetic pole film P2 (19) via magnetic pole film P3 (17a) by flowing a current to the Cu coil pattern 33.

Figure 9A:
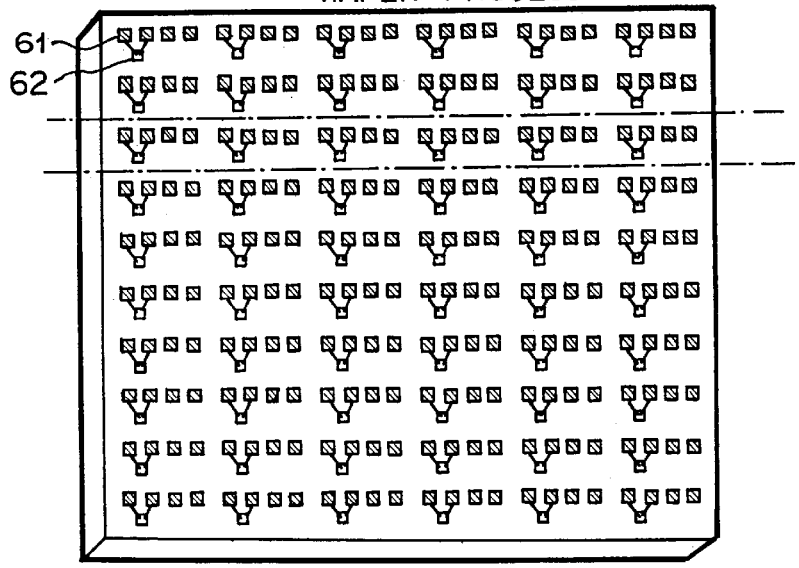
FIGS. 9A through 9D are a diagram for explanation of a process for manufacturing the MR complex head according to the first embodiment of the present invention.
Figure 9B:
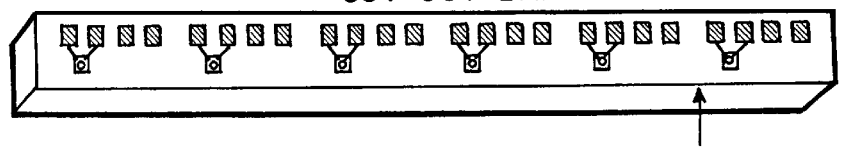
Figure 9C:
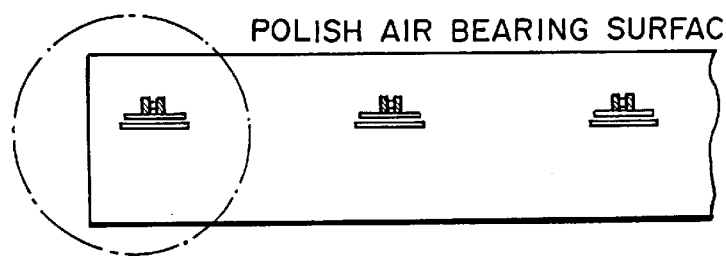
Figure 9D:
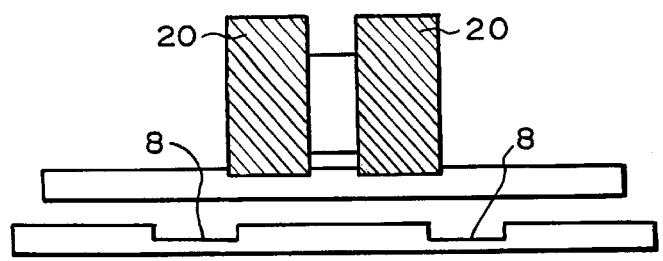
Figure 10:
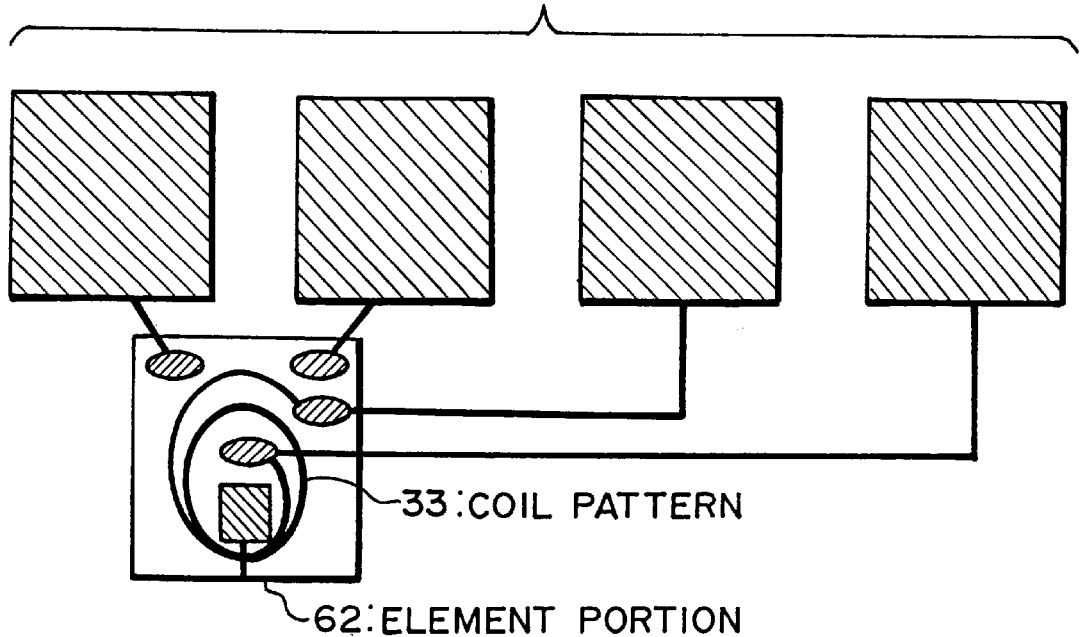
FIG. 10 is a plan view of the MR complex head and electrode terminals.
Figure 11:
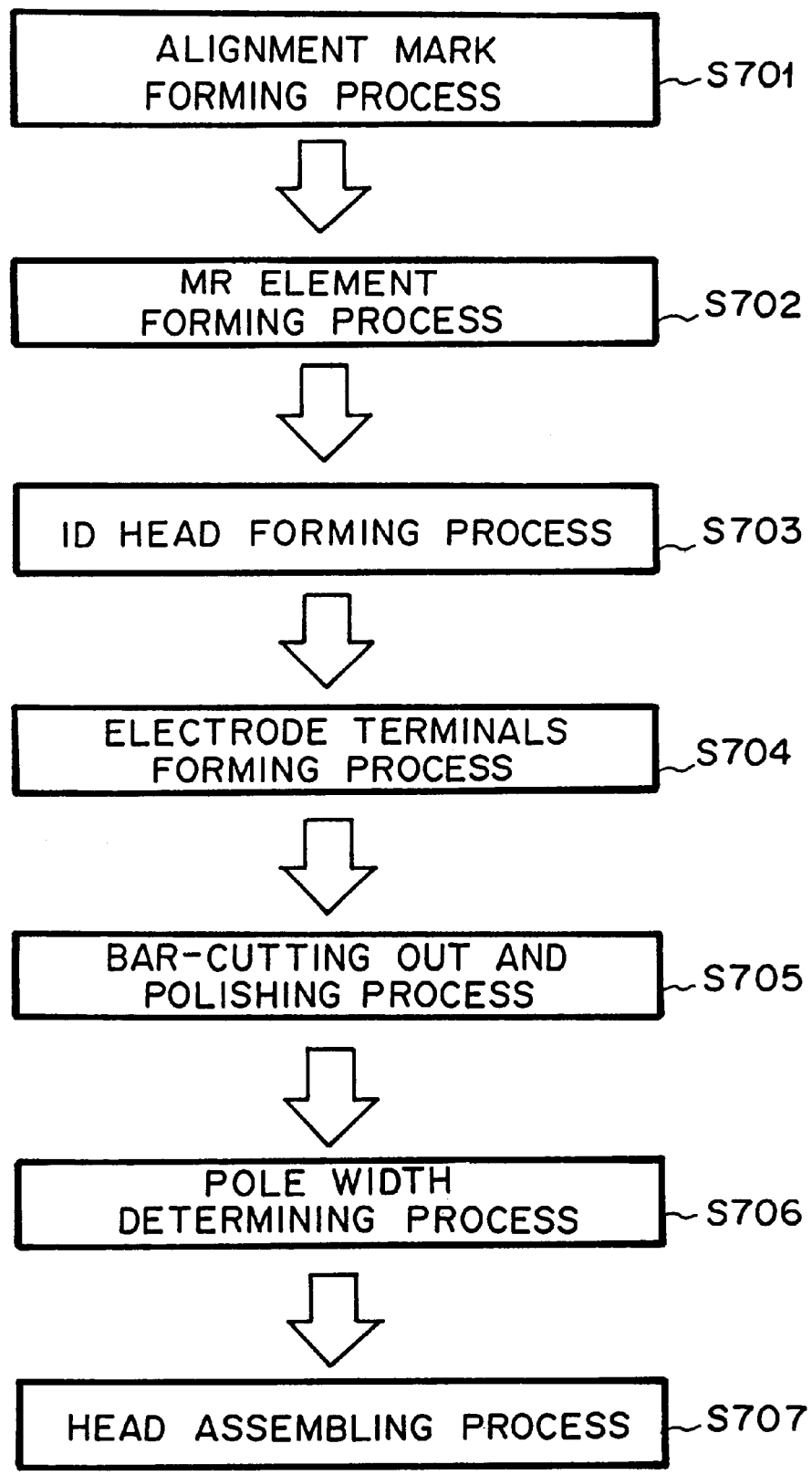
FIG. 11 is a flow chart for explanation of the process for manufacturing the MR complex head according to the first embodiment of the present invention.

A method for manufacturing the MR complex head as shown in FIG. 8 will be explained hereunder with reference to FIGS. 9, 10, and 11.

First, alignment mark which will be a reference for positioning a mask for forming MR element 15 and inductive elements 17, 18, and 19 is formed, using a photomask, on a film, which will be lower shield S1 (10), at step S701. At this time, recesses 8 for positioning pits 20 which will determine the width of magnetic pole film P2 (19) is formed, using the same photomask for the alignment mark, on the film which will be lower shield S1 (10). That is, the alignment mark and the recesses 8 are formed using a single photomask. Thereafter, MR element 15 for reading, inductive elements 17, 18 and 19, and electrode terminals 61 shown in FIGS. 9 and 10 are sequentially formed using the alignment mark as a reference for their positions at steps S702, S703, and S704, respectively. Thereafter, a bar is cut out from a wafer with the formed members as shown in FIG. 9B and then the bar is polished from an air bearing surface to expose element portion to the air bearing surface as shown in FIG. 9C at step S705. Thereafter, pits 20 determining width W1 of magnetic pole films P2 (19) and P3 (17a) are formed by edging with a focused ion beam while using recesses 8 as references of positions as shown in FIG. 9D at step S706. At step S706, an alignment using recesses 8 is executed in order to determine a position of each of pits 20 to be formed. Finally, a chip is cut out from the bar and the chip is assembled in a suspension at step S707.

Pits 20 may be formed by forming a photomask which is aligned with reference to recesses 8 and executing an ion beam edging using the formed photomask instead of executing edging with a focused ion beam. In the case of forming pits 20 by edging with the focused ion bean, elements are manufactured one by one. On the other hand, in the case of forming pits 20 by using the photomask, plural elements may be manufactured simultaneously.

Figure 5:
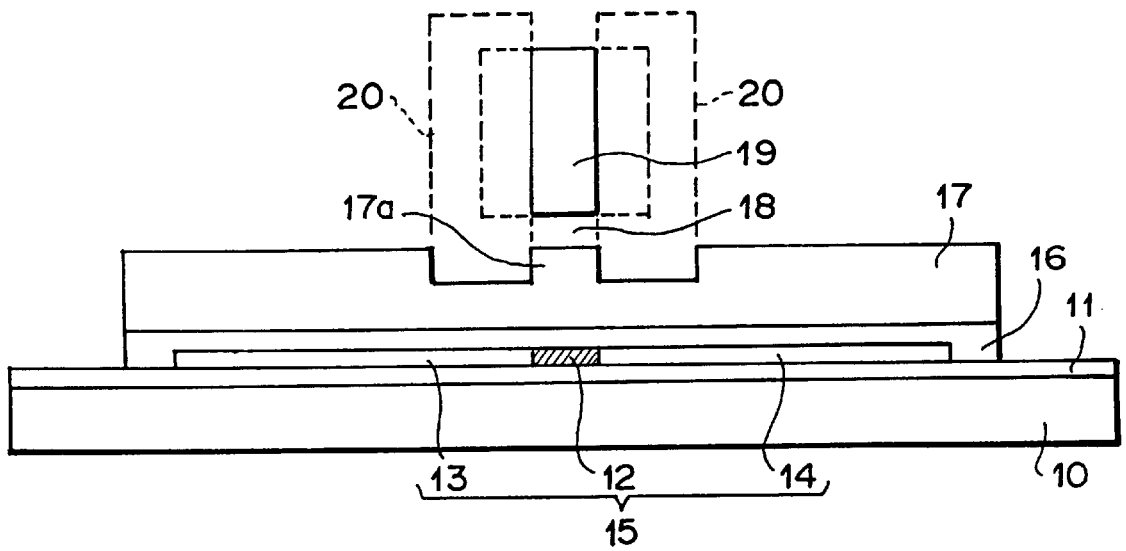
FIG. 5 is a front elevation of the MR complex head of the third prior art.
Figure 6:
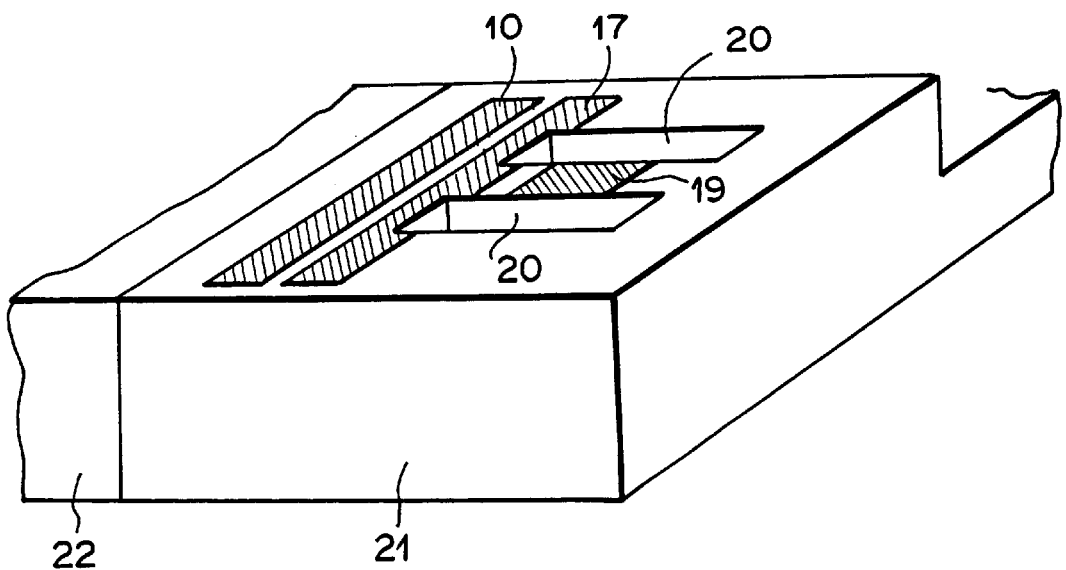
FIG. 6 is a perspective view of the MR complex head of the third prior art.
Figure 7:
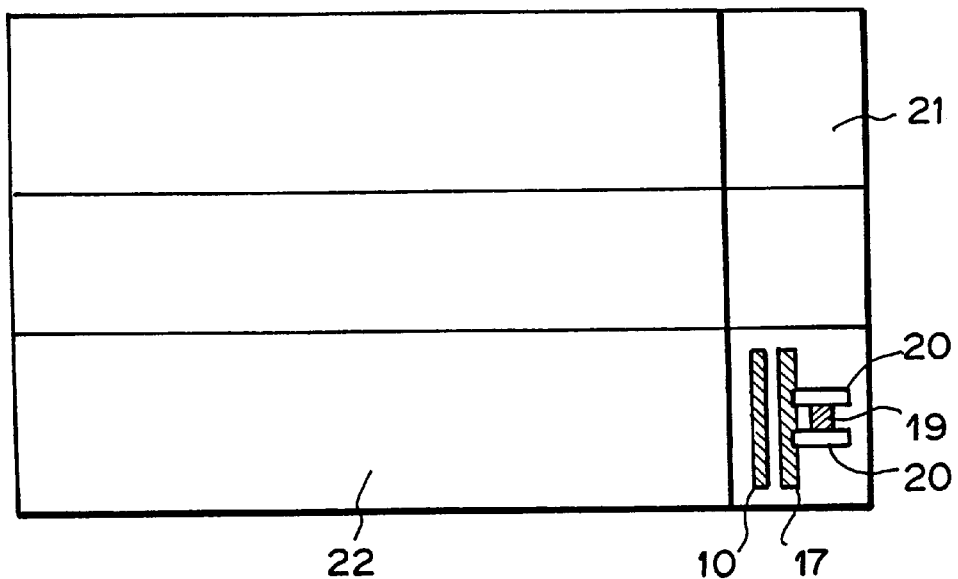
FIG. 7 is a front elevation of a slider with the MR complex head of the third prior art.

For the purpose of comparison with the MR complex head of this embodiment, a reference MR head which is common in dimensions and materials with the MR complex head of this embodiment was made. Referring to FIG. 5, the reference MR head does not have, in lower shield S1 (10), recesses 8 which will be a reference when forming pits 20 determining a width of magnetic pole film P2 (19) from an air bearing side. Therefore, when forming pits 20 determining the width of magnetic pole film P2 (19), positions of pits 20 were determined using magnetic pole film P2 (19) as a reference.

A result of comparison between the MR complex head of this embodiment and the reference MR complex head with respect to an offset between the MR head for reading and the ID head for recording along lateral direction is as follows. That is, a triple of a standard deviation of the offset was 0.1 $\mu$m for the MR complex head of this embodiment, while it was 0.4 $\mu$m for the reference complex head. This result shows a remarkable improvement of this embodiment. The reason is explained as follows. That is, for the reference MR complex head as shown in FIG. 5, not only a variation caused by an offset of an MR head with respect to an alignment mark and a variation cause by an offset of an ID head with respect to the alignment mark but also a variation caused by an offset of pits 20 with respect to the ID head are summed up one another. On the other hand, only a variation caused by an offset of an MR head with respect to an alignment mark and an offset of pits 20 with respect to the alignment mark are summed up each other, and an offset of an ID head with respect to the alignment mark is not summed up. Therefore, the sum of offsets of the MR complex head of this embodiment is suppressed as compared to the sum of offsets of the reference MR complex head as the actual measured values show. Thus, according to the MR complex head of this embodiment, a yield rate is improved.

[Second Embodiment]

Figure 12:
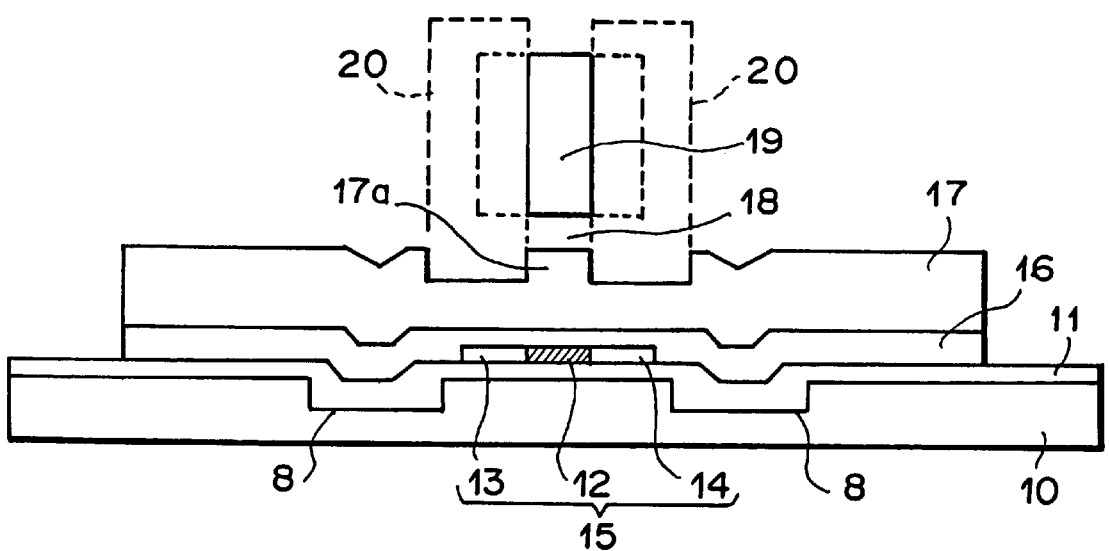
FIG. 12 is a front elevation of an MR complex head according to a second embodiment of the present invention.

Referring to FIG. 12, an MR complex head according to the second embodiment has a structure in which terminal regions 13 and 14 of MR element 15 do not extend to portions over recesses 8 formed in lower shield S1 (10). The other structure is the same as the first embodiment. For the MR complex head of the first embodiment, there is a possibility that terminals 13 and 14 short-circuit with lower shield S1 (10) and upper shield S2 (17) if a step coverage of magnetic separators 11 or 16 composed of a insulator film is not perfect around a step at each end of each of recesses 8 because terminal regions 13 and 14 are disposed over lower shield S1 (10) though terminal regions 13 and 14 are sandwiched between magnetic separators 11 and 16. The disadvantage of such short-circuit is avoided according to the second embodiment.

As explained above, according to the present invention, a variation of an offset between an MR head and an ID head on a wafer is suppressed notwithstanding the MR head and ID head are piled up. Therefore, an MR complex head according to the present invention enables a high-density recording owing to a narrow track and improved side fringe characteristics. Especially, the MR complex head according to the present invention is effective for an ultra high-density recording of a track width narrower than 1 $\mu$m.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A magnetoresistance effect type complex head structure comprising:
    a) a magnetoresistance effect head comprising:
        a magnetoresistance effect element comprising a central region for detecting a magnetic field from a record medium and a pair of terminal portions for supplying a bias magnetic field and a current to said central region;
        a pair of insulating magnetic separators enclosing said magnetoresistance effect element; and
        first and second magnetic shield films confronting each other enclosing said magnetoresistance effect element and said pair of magnetic separators;
    b) an inductive head comprising:
        a first magnetic pole film constituted by said second magnetic shield film of said magnetoresistance effect head;
        a second magnetic pole film separated from said first magnetic pole film by a magnetic gap; and
        a coil pattern for generating a magnetic flux within said first and second magnetic pole films; and
    c) a pair of pits formed in a portion of said head structure separate from said first magnetic shield film in a direction perpendicular to an air bearing surface of said head structure and disposed on both lateral sides of said second magnetic pole film to define a width of said second magnetic pole film,
    said first magnetic shield film including a pair of recesses extending into said first magnetic shield film in a direction parallel to said air bearing surface and perpendicular to a major surface of the first magnetic shield film, said pair of recesses having a fixed relationship to said pair of pits for defining a position of said pair of pits during formation of said head structure.

2. The magnetoresistance effect type complex head structure according to claim 1, wherein each of said recesses is disposed under each of said pair of terminal portions.

3. The magnetoresistance effect type complex head structure according to claim 1, wherein each of said recesses is disposed under an outwardly and laterally extended position from each of said pair of terminal portions.

4. The magnetroresistance effect type complex head according to claim 1, wherein a width of said second magnetic pole film is less than 1 $\mu$m.

5. The magnetoresistance effect type complex head structure according to claim 1, wherein said pair of pits define a pair of recesses in said first magnetic pole film such that a third magnetic pole film projecting toward said second magnetic pole film between said pits and having a width the same as a width of said second magnetic pole film is formed.

* * * * *